3,113,030
METHOD OF PREPARING A LIQUID MEAT PRODUCT
Julius Brody, 119 Glenway St., Dorchester, Mass.
No Drawing. Filed Aug. 19, 1960, Ser. No. 50,562
5 Claims. (Cl. 99—108)

The present invention relates to a process for treating meat wherein the meat is liquefied to its principal protein break down products, proteoses, peptones, polypeptides, and minor amount of amino acids. When the liquefaction is properly carried out, the product resembles in consistency, milk or light cream (20% fat cream) or a consistency within the ranges of these two products. The composition is partially a colloidal dispersion, partially a fine suspension and partially in an analytical solution. If desired, selected amounts of vitamins, coloring agents and flavoring ingredients may be mixed with this finely divided product. The composition may be colloidally dispersed in a liquid such as water or in a gel form or alternately may be dehydrated.

The present invention also relates to a method of preparing a composition as described above, wherein fresh meat is ground to a finely divided state, a selected amount of water is added while maintaining the pH of the meat slightly acid and the temperature at between 50° C. and 60° C. The mixture is then rapidly agitated in the presence of naturally occurring cathepsins or catheptic enzymes and preferably added amounts of proteolytic enzymes for a period of approximately two hours. This breaks down the meat into a finely divided stage as described above. The mixture may then be pasteurized to inactivate the enzymes and to kill vegetative cells, reducing thereby the microbial flora.

In the process of the present invention, liquefaction of the meat is effected through the action of self-digesting catheptic enzymes augmented by added proteolytic enzymes and rapid agitation at a temperature sufficiently high to effect the liquefaction within a reasonable time but not so high as to break down other desirable meat constituents including vitamins for example.

It is, therefore, an object of the present invention to provide a process wherein whole meat including meat, trimmings, muscles and organ meats which are less commercially desirable may be treated to convert the meat from its ordinary soft-solid consistency to a palatable, highly nutritious and digestible liquid meat product. Such process may be utilized to prepare a product which is fluid, concentrated or dehydrated without loss of natural vitamins. In dehydrated form, the product is partially soluble and the remainder capable of suspension or dispersion in a liquid vehicle such as water.

It is also an object of the present invention to provide a meat product which is easily digestible and assimilable. The product is particularly adapted for consumption by the ill, infirm, or infants. It is also quite suitable for use as emergency rations since the product may be dehydrated for subsequent reconstitution with the addition of water. Such product is particularly useful by the military or for similar purposes.

It is also an object of the present invention to provide a highly nutritious protein source food which will not unduly tax the digestive system and which may, if desired, be blended into soups, or mixed with croutons, etc. As this liquid meat process is partially biochemical and partially mechanical, one is able to obtain a good liquefaction of the meat before a complete hydrolysis of the meat proteins to the amino acid stage takes places. The fact that the amino acid content is low is evident as the flavor of the liquid meat is good. If it were high in amino acids, its flavor would be distasteful.

In the preferred form of this invention, a quantity of meat is ground to relatively small particle size by passing the meat through a conventional butcher's meat grinder several times with the grinder adjusted to its finest grinding size. The smaller are the meat particles, the better. The meat is then mixed with water and thereby diluted by the addition of water weighing between 5% and 100% by weight of the meat. Preferably water in an amount weighing about 60% by weight of meat is added. The amount of water will vary depending upon the degree of fluidity desired and the strength of the flavor desired. The mixture is then maintained at a temperature of between 50° C. and 60° C. with the mixture having a pH of between 5 and 6.5. A suitable proteolytic enzyme of animal, plant or microbial origin such as trypsin, papain, bromelin, ficin or Rhozyme P11 (a proteolytic enzyme of fungal origin), Rhozyme A-4 (a proteolytic enzyme derived from *Aspergillus orzyae*) in the amount of preferably between .01% to 1.0% of the protein content of the meat is added. The concentration of enzyme depends upon the purity of the enzyme used, the time allowed for the enzyme action and the nature of the substrate. It is most preferable to use members of the proteinase type of enzymes. The proteinases hydrolyze proteins to proteoses, peptones, peptides and some amino acids. This mixture is then rapidly agitated for a period of between 1 hour and 2½ hours but preferably approximately 2 hours. The temperature is preferably raised from approximately 50° C. to 55° C. during the first hour to between 55° C. and 60° C. for the remainder of the period, with 57° C. being an optimum.

Since this agitation period is short and the temperature relatively high, microbial activity in the composition is inhibited. Further, the catheptic and proteolytic enzymes partially hydrolyze the meat proteins without affecting the vitamins or other growth factors of the meat.

After this agitation, the composition is substantially a colloidal dispersion since the major solid portion of the meat is in the colloidal range. A certain amount, however, is a fine suspension. The rest is in an analytical solution.

This liquid composition may then be further treated by adding minor amounts of additives to enhance the flavor and appearance. For example, ascorbic acid and citric acid or lemon juice may be added as an aid to flavor and appearance of the liquid meat. Dextrose in the range of approximately 1% to 5% by weight of the total volume may be added. Similarly, monosodium glutamate may be added to improve the flavor.

The liquid composition may be further enriched by the addition of various vitamins and minerals, protein concentrates such as brewer's yeast, casein, soy bean meal, etc. to make a completely balanced diet by itself.

The liquid meat also may be rendered more desirable clinically by removing its sodium ion content with the aid of commercially available suitable ion exchange resins.

A wide variety of meats may be used in this particular process. As used, herein meat is defined as "Meat and meat food products include the skeletal tissue of cattle, swine, sheep, poultry and game and the organs which may be used as food such as tongue, liver, kidney, lung, heart, pancreas, brain, thymus and spleen" (Handbook of Food and Agriculture, by F. C. Blank, p. 533 4/10). Thus, such meats as beef, liver, chicken, turkey, bacon, fish, mutton, veal or other proteinaceous material may be used in the present invention. The present invention also contemplates the utilization of organ and muscle meats. The utilization of lower grades of meat is particularly desirable not only because such meats are less expensive, but also because they have a lower fat content and therefore, a higher percentage of protein. In addition, the end product is unaffected by the relative toughness of the original meat from which the end product was derived. Therefore, lower grade meats may be utilized without sacrificing digestability in any respect. To the extent that these lower grade meats may vary in flavor and color, the end product may be treated by the addition of flavoring and additional coloring.

If desired, the higher grades of steer meat such as "prime" or "choice" meat may be used in combination with lower grades in any desired mixture.

The liquid product may be frozen, partially diluted, or frozen in concentrated form. It also may be dehydrated by any well-known dehydrating process, including for example, spray drying, drum drying under vacuum, freeze drying or lyophilization or high vacuum drying. It may also be packaged in cans in any of the well-known methods.

Specific examples of the process will illustrate the invention:

*Example 1.*—700 grams of tenderloin and 35 grams of bone marrow are comminuted by grinding in a conventional butcher's meat grinder. The outer disc of the grinder has orifices with an average diameter of about $\frac{1}{16}$ of an inch. Water in an amount of 60% by weight of the meat, 0.35 gram of a protease enzyme of fungal origin, 7 grams of dextrose, 1.8 cc. of liquid vitamin C and 1.4 cc. of lemon juice are mixed together. The composition is then rapidly stirred by mechanical agitation for a period of one and one-half hours at a temperature of 55° C. The composition is then pasteurized at 80° C. for a period of 20 minutes. While the composition is rapidly cooled by a cold water bath, 1.4 grams of monosodium glutamate and .7 cc. of Worcestershire sauce are added. The finished product may be stored in the freezer.

*Example 2.*—1744 grams of tenderloin steak with 256 grams of bone marrow are ground in a butcher's meat grinder by passing the meat and marrow through the grinder four times. The orifice openings of the grinder are between $\frac{1}{16}$ and $\frac{1}{32}$ of an inch. 1000 grams of water, 4.0 grams of a protease enzyme of fungal origin (Rhozyme P11) are added. The temperature is maintained at 50° C for one-half hour while the mixture is rapidly agitated with a mechanical agitator, and thereafter, the temperature is maintained at between 55° C and 57° C. for one and one-half hours while the agitation is continued. A mixer with its speed controlled by a rheostat having a paddle rotating at a maximum speed of 1550 r.p.m. was used. The composition is thereafter pasteurized at 75° C. to 80° C. for twenty minutes. It is thereafter cooled rapidly to room temperature, to minimize thermophilic bacterial activity. While cooling, 3 grams of monosodium glutamate are added together with 2 grams of Worcestershire sauce.

This particular composition was divided into two lots with one lot canned and the other dehydrated, each by well-known means.

The process may be utilized to prepare a composition having a gelatin or butter-like consistency by the addition of suitable gelling or thickening agents. Such composition may be eaten with a spoon without likelihood of spilling or may, for example be used as a spread. An example of the process for producing such composition is:

*Example 3.*—1800 grams of tenderloin was ground in a conventional butcher's meat grinder three times. The outer disc of the meat grinder had orifices measuring between $\frac{1}{16}$ of an inch and $\frac{1}{32}$ of an inch in diameter. The meat may be mixed with water weighing 60% of the weight of the meat and powdered dextrose weighing 1.5% of the weight of the meat. In addition, .4% of proteolytic enzyme, Rhozyme P11, on the basis of total protein content of the meat was added. The meat, water, dextrose and enzyme were mixed for 15 minutes by rapidly stirring them manually. The mixture was heated so that the temperature rose to 55° C. over a 15 minute period. Subsequently a rapid mechanical agitation was applied for one and-three quarter hours with the temperature maintained at between approximately 55° C. and 60° C. The mixture was then in liquefied form with a portion of the mixture a colloidal dispersion, a portion of it was a fine suspension, and the balance of a solution. Following the liquefaction of the mixture, it was pasteurized by raising the temperature to between 75° C. and 80° C. for a twenty-minute period. 0.5% of total weight of a (225 Bloom) gelatin was added. It is preferable to use a neutral type of bone gelatin with a pH of about 6. The gelatin is previously liquefied by adding 4 to 6 parts of water to one part of gelatin and allowing the gelatin to soak at room temperature for several hours. The mixture is heated and added while the mixture is at about 80° C. The mixture was then rapidly cooled to room temperature by running cold water through the liquid container. While the mixture was cooling, .2% of monosodium glutamate and .1% of Worcestershire Sauce was added with constant stirring. When the mixture had been completely cooled to room temperature, it was in gel form on refrigeration and capable of being stored in any suitable manner.

The process may also be utilized to produce a low fat content product. An example of such process is as follows:

*Example 4.*—The process is the same as the process described in Example 3 except that after liquefaction of the meat but before pasteurization, the mixture is treated with a suitable (food grade) demulsifier, a surface active reagent, e.g. Ethofat 0.20 or Ethofat 242/25. These materials are mono-fatty or rosin and esters of polyoxyethylene glycols. They are fairly stable in mild acid or alkaline solutions but can be hydrolyzed with strong acids or alkalis. The temperature is raised to about 90° C. and thereafter the mixture is centrifuged and the layer of centrifuged fat is removed. The remainder of the mixture is thereafter treated in the manner described in connection with Example 3.

A suitable powdered concentrate may be made by the following:

*Example 5.*—The process for making a powdered concentrate is the same as set forth in Example 3, except the gelatin is not added and the end product is thereafter dehydrated. The end product may be dehydrated in any of the following well-known processes:

(a) Spray drying,
(b) Drum drying under vacuum, and
(c) Lyophilization.

Such powdered concentrate may be utilized as a meat soup base, or may be incorporated in various food products such as breads, rolls, beefsteak pies, etc. Whether the meat is in the liquid form or in the powdered form, it may readily be incorporated in an amount up to approximately 10% by weight of the solid content in cereals, breads, dough, beefsteak pies, or other bakery products. This addition enriches the lysine and the methionene content of the cereals, breads, etc. which otherwise are very deficient in these two amino acids. It may also be utilized by adding the powdered concentrate to hot water to reconstitute it as a liquid meat composition.

Further examples of the present invention are as follows:

*Example 6.*—The process followed is the same as in Example 3, except the gelatin is omitted. The end product of Example 3 is then concentrated under vacuum to a syrupy consistency.

*Example 7.*—A product which may be digested over a relatively longer period of time may be made by adding to the product mentioned in Example 3, between 5% and 20% by total weight of mixture of dextrimaltose, glucose or croutons, or other carbohydrates or cereals, because of the sparing action that carbohydrates have on proteins. Dextrose, by exerting a sparing action on proteins, extends thereby further the degradation, absorption and assimilation of the liquid meat product over a longer period of time.

A composition may also be prepared utilizing meat, water and a food acid without an enzyme additive. An example of such process follows:

*Example 8.*—1500 grams of muscle meat and 300 grams of organ meats are ground in a conventional butcher's meat grinder four times. This grinder has orifices of an average diameter between $\frac{1}{16}$ of an inch and $\frac{1}{32}$ of an inch. To this meat is added 60% by weight of the meat of water. The acidity of the mixture of meat and water is adjusted to a pH of approximately 4.5. A range of 3.5 to 5.0 is satisfactory. This adjustment may be made by the addition of a food grade of phosphoric acid or other suitable food grade acid such as citric, lactic, tartaric or acetic acid. The mixture is then thoroughly stirred and agitated at a temperature of approximately 55° C. for a period of one hour. The temperature is then raised to approximately 60° C. and the rapid stirring is continued for a second hour. Following this the liquid mixture may then be pasteurized by raising the temperature to between 70° C. and 80° C. for twenty minutes. Subsequently the mixture is rapidly cooled by suitable means.

In this particular process the action of the cathepsins is relied upon for hydrolysis of the meat. Normally during the process the pH will naturally adjust itself from approximately 4.5 to a range of between 5.0 and 6.5. If the initial pH is lower, as for example about 3.5, it may be necessary after completion of the liquefaction to neutralize the acidity by the addition of a base such as sodium hydroxide. This process may be varied by increasing the water up to about 100% using a range of 5% to 100% of water by varying the temperature between about 50° C. and 60° C. and varying the time interval.

A further example of the present invention contemplates the utilization of meat and water only. This example, however, is relatively difficult to process and handle and does not produce the same high quality satisfactory results as previously discussed examples. The process also requires the utilization of special equipment.

*Example 9.*—1000 grams of minced stewing beef are mixed with 1000 cc. of water. Between 50% and 150% approximately of the meat weight of water may be utilized if desired. The mixture is then heated with manual agitation for approximately 30 minutes at a temperature of approximately 55° C. The temperature may be varied between about 50° C. and 60° C. Following this the mixture is stirred rapidly with a mechanical agitator for two hours at a temperature of preferably approximately 55° C. The temperature may be varied between about 50° C. and 60° C. The mechanical agitator may be one in which the mixer is the agitator paddle or mixer rotates at a maximum speed of 1550 r.p.m. After the agitation of the mixture it is passed through a colloidal mill or homogenizer where the composition is thoroughly homogenized. If a larger sample than 1000 grams is used, the composition could first be passed through a Fitzpatrick comminuter and then through either a colloidal mill or homogenizer. When the mixture is comminuted or homogenized, it is best that this step take place in an oxygen-free atmosphere. Malt may also be used to aid in proper liquefaction:

*Example 10.*—A further example is exactly the same as Example 9, except that in addition to the 1000 grams of minced stewing beef and 1000 cc. of water, between 1 and 10% by weight of the protein of malt is added.

To produce a liquid meat low in sodium ions, it is necessary to pass it twice through ion exchange resins as follows:

*Example 11.*—First, pass the meat after liquefaction through a cation exchange resin such as Amberlite IR-100 which is a phenolic methylene sulfonic resin. This treatment substitutes hydrogen ions for the sodium ions and thereby acidifies the solution. Secondly, pass the already treated liquid meat through an anion exchange resin, such as Amberlite IR4B, a weak base resin. This treatment replaces the chloride ions and substitutes the hydroxyl ions therefore. The hydrogen and the hydroxyl ions will form water and the liquid meat solution or dispersion will remain neutral, and low in sodium ions.

Liquefaction of the meat proteins may be accomplished with malt:

*Example 12.*—Dilute 2000 grams of finely comminuted beef with 65% of the weight of the meat of water. One may use a range of approximately 50% to 100% water. Adjust it to a pH=5.0 approximately. Preferably 5% malt based on the total weight of meat is added. One may use a range of 1% to 10% approximately based on the total weight of meat. The temperature is raised to approximately 45° C. One may use a range of 38° C. to 50° C. approximately. After admixing the contents, the mixture is permitted to set for several hours at a temperature of approximately 45° C., to favor the action of the proteolytic enzymes of the malt. Then the temperature is raised to about 80° C., and maintained at that temperature for about 20 minutes to inactivate the enzymes. It is then cooled rapidly and stored in freezer.

The liquid meat product described in the examples suspended and partially dissolved in water is not a mere extract of meat concentrate but comprises the entire meat product in liquid form. It differs from meat extract concentrates, as such concentrates normally are derived from concentrating the water in which meat has been boiled. Thus, not all of the meat composition is incorporated in the meat extract. In addition, much of the food value is destroyed in heating the meat during the extract concentration process. In addition, since the product of the present invention contains principally partially digested proteins there is a more rapid reaction between the stomach fluids and the product of the present invention than when regular meat is eaten. Meat extractives in general are exciting agents which stimulate gastric secretions which are directly proportional to the amount of meat eaten. This quality of inducing great physiological activity of the stomach gives it great satiety value. When liquid meat is consumed, its satiating effect is therefore very rapid.

What is claimed is:

1. A method of making a liquid meat product comprising mixing a quantity of meat particles with between approximately 5% and 100% of the weight of said meat of water, adjusting pH of the mixture to a value between approximately 3.5 and 4.5, stirring said mixture rapidly while the temperature of the mixture is maintained at between approximately 50° C. and 60° C. for a period of time sufficient to subject said meat to liquefaction wholly by the catheptic enzymes of said meat.

2. A method as set forth in claim 1 wherein said temperature is raised from between 50° C. and 60° C. after a two hour period of stirring to between 70° C. and 80° C. for twenty minutes whereby said liquid meat product is pasteurized.

3. A method as set forth in claim 1 and further including the steps of passing the liquefied meat through a cation exchange resin and then through an anion exchange resin to substantially reduce the sodium ion content of the resulting product.

4. A method as set forth in claim 1 wherein said pH is adjusted by addition to the mixture of a food grade acid selected from the group consisting of phosphoric, citric, lactic, tartaric and acetic acid.

5. A method as set forth in claim 1 wherein a food grade demulsifier is added after said rapid agitation, the temperature is raised to approximately 90° C. and the mixture is centrifuged and centrifuged fat is thereafter removed from the mixture.

References Cited in the file of this patent

UNITED STATES PATENTS

| | | |
|---|---|---|
| 2,560,011 | Trudel | July 10, 1951 |
| 2,589,288 | Ryan | Mar. 18, 1956 |
| 2,753,269 | Hawk et al. | July 3, 1956 |
| 2,806,790 | Bedford | Sept. 17, 1957 |
| 2,938,796 | Zick | May 31, 1960 |
| 2,963,376 | Hogan et al. | Dec. 6, 1960 |
| 3,071,468 | Docken | Jan. 1, 1963 |